Jan. 4, 1938. W. R. MACKLIND 2,104,162
CENTRIFUGAL SEPARATOR
Filed April 8, 1935 5 Sheets-Sheet 1

Inventor:-
William R. Macklind,
By Wilson, Dowell, McCanna & Foley Attys.

Jan. 4, 1938.  W. R. MACKLIND  2,104,162

CENTRIFUGAL SEPARATOR

Filed April 8, 1935  5 Sheets-Sheet 3

Inventor:—
William R. Macklind,
By Wilson, Dowell, McCanna & Foley Attys

Jan. 4, 1938.  W. R. MACKLIND  2,104,162
CENTRIFUGAL SEPARATOR
Filed April 8, 1935  5 Sheets-Sheet 5

Inventor
William R. Macklind,
By Wilson, Dowell, McCanna & Foley Atty's

Patented Jan. 4, 1938

2,104,162

UNITED STATES PATENT OFFICE 2,104,162

CENTRIFUGAL SEPARATOR

William R. Macklind, Chicago, Ill.

Application April 8, 1935, Serial No. 15,179

13 Claims. (Cl. 233—2)

This invention pertains to centrifugal separators in general, and while the principles thereof may be embodied in separators of various sizes may be adapted for a variety of purposes, the embodiment of the invention herein disclosed for illustrative purposes is adapted to be constructed in very large sizes for use in separating solids from liquids, or colloidal matter from liquids of different specific gravity from that of the matter to be separated therefrom.

One of the primary purposes of this invention is the provision of a centrifugal separator which will be capable of separating solids from liquids by a continuous operation during which the separated solids are discharged substantially free from liquid, and the liquid is simultaneously discharged substantially free from any solid contents. A separator constructed in accordance with the principles of my invention is capable of effecting such continuous operation in volumes ranging from a few gallons to seventy thousand gallons or more per minute per unit.

Another feature of my invention resides in the elimination of filter cloths or other filtering medium or material which, in use, soon become clogged up and inefficient, the entire separation, in accordance with my invention, being accomplished by centrifugal force, with the result that the replacement and maintenance costs are very low.

Another advantageous feature of my invention is that the construction is such that the parts subjected to contact with the fluids upon which the separating action is performed may be covered with acid or alkali-resisting coatings, thereby enabling the employment of a separator in the separation of liquids of almost any pH degree without injury to the apparatus from corrosion or deterioration.

Another object is the provision of a separator in which the separated solids will serve as a lock or seal to prevent leakage, under the action of centrifugal force, of the liquid from the machine, while at the same time permitting and insuring the discharge of the separated solids in accordance with the rate of their separation from the liquid.

A further object is to provide a centrifugal separator which will be reliable and efficient in operation, which can be constructed at a reasonable cost, which can be readily dismantled for repairs or replacements when required, and which will be suitable, with slight detail modifications, for a wide variety of uses for which centrifugal separators heretofore have not been adapted. For instance, a separator constructed in accordance with the principles of my invention may be used for sewage treatment purposes, to separate the solids and colloidal matter from the liquids. It is particularly suitable for the treatment of liquid effluent from industrial plants, for the treatment of water for municipal use, for the separation of solids of various characters from liquids in the mining industry, and in the manufacture of many commercial products; and it is even adaptable to the treatment of crude oil as it comes from the wells for removing the residue or settlings which at present can only be removed by gravity settlers which necessitate the investment of enormous capital.

Another object of my invention is to provide a centrifugal separator which will not only effect continuous, as distinguished from intermittent, separation, but will positively discharge the separated solid matter from the machine; thus obviating the uncertainties of discharge under gravity or centrifugal force. Furthermore this positive discharge, by extrusion under pressure, results in the delivery of the solid matter in a substantially dry condition.

Another advantageous feature of my invention is found in the mechanisms by which the positive discharge is accomplished and controlled, these mechanisms being designed and operated to effect the positive discharge of the solids without exerting undue strain upon the operating parts, or throwing the machine out of balance. In addition the rate of discharge may be readily regulated and controlled in accordance with the rate of separation by simple adjustments which may be made while the machine is running.

Other objects and many of the inherent advantages of my invention will be readily appreciated as the same become better understood by reference to the following description when considered in connection with the accompanying drawings.

Referring to the drawings:

Fig. 7 is a similar view showing the valve in exhaust position;

Referring to the drawings more in detail and first more particularly to Figs. 1 and 1a, reference character 21 indicates the base of the machine upon which the operating parts are carried, a frame construction 22 of integral or built up structure being extended upwardly from the base to rigidly support a plate or table 23 upon which the weight of the rotor to be later described rests.

A heavy central shaft 24 extending vertically through the table is supported upon the table in a suitable bearing, preferably of the ball type, indicated at 25. A sleeve 26 depending from the table is equipped at its lower end with a guide bearing 27, preferably also of the ball type. At its upper end the shaft is further guided in a suitable bearing 28 carried by a holder 29 affixed to the housing cover 31, the annular vertical walls 32 of the housing being bolted at their lower ends to the margin of the table 23 as indicated at 33, and the cover being similarly bolted to the upper ends of these walls as indicated at 34. The main shaft is thus rotatably supported and guided by a plurality of spaced bearings which firmly maintain the shaft in position and insure against wobbling and vibration.

Figure 1:
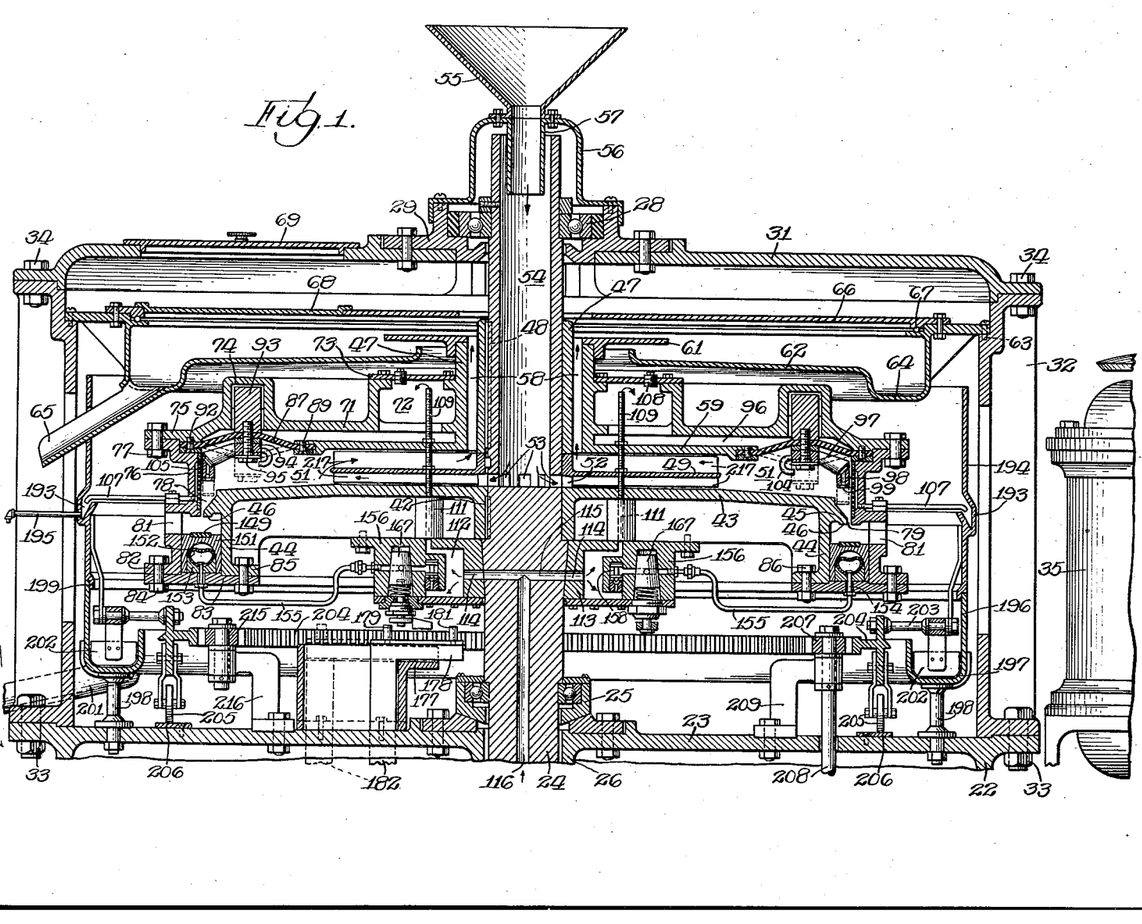
Figs. 1 and 1a constitute a vertical sectional view taken on the axis of a separator embodying my invention.
Figure 1A:
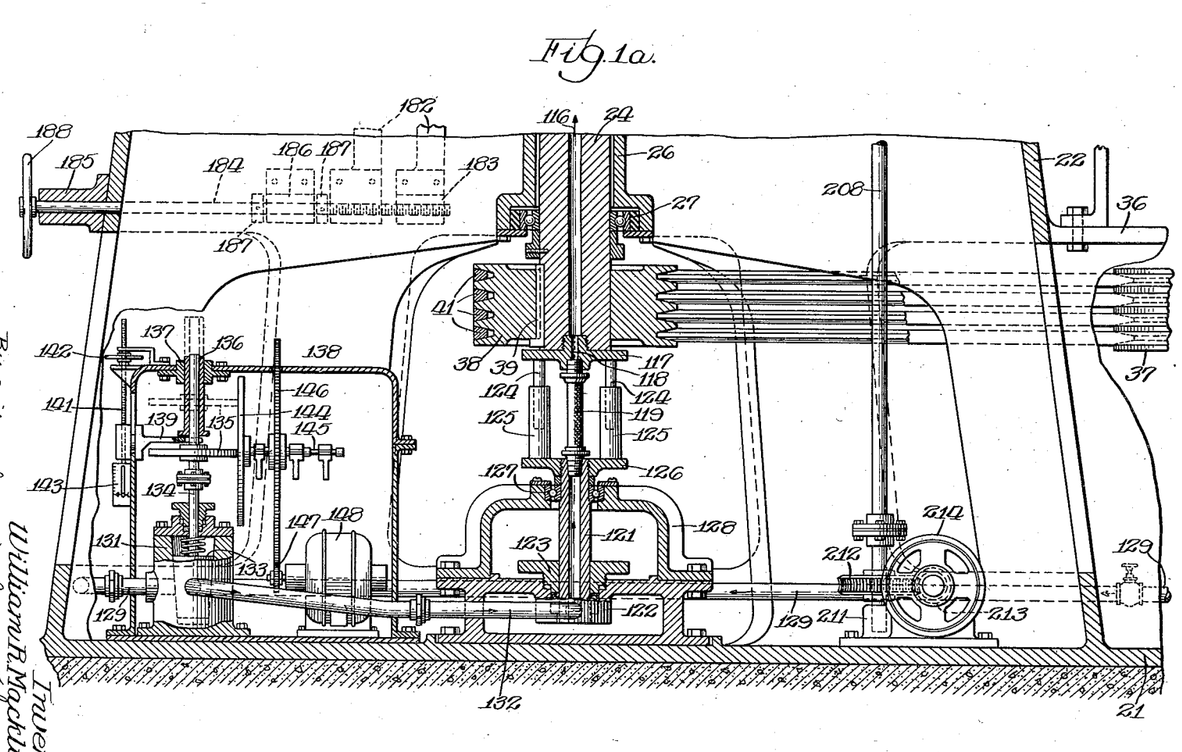

The shaft may be driven at the requisite speed in any appropriate manner, a suitable provision for driving it being exemplified in Figs. 1 and 1a as consisting of an electric motor 35 mounted upon an extension 36 of the frame structure 22 and carrying a drive pulley 37 aligned with a driven pulley 38 keyed as indicated at 39 to the lower end of the shaft 24. These drive and driven pulleys in this instance are illustrated as of the grooved type adapted for cooperation with a plurality of V-belts 41.

Figures 2, 3, 4, 5, 6:
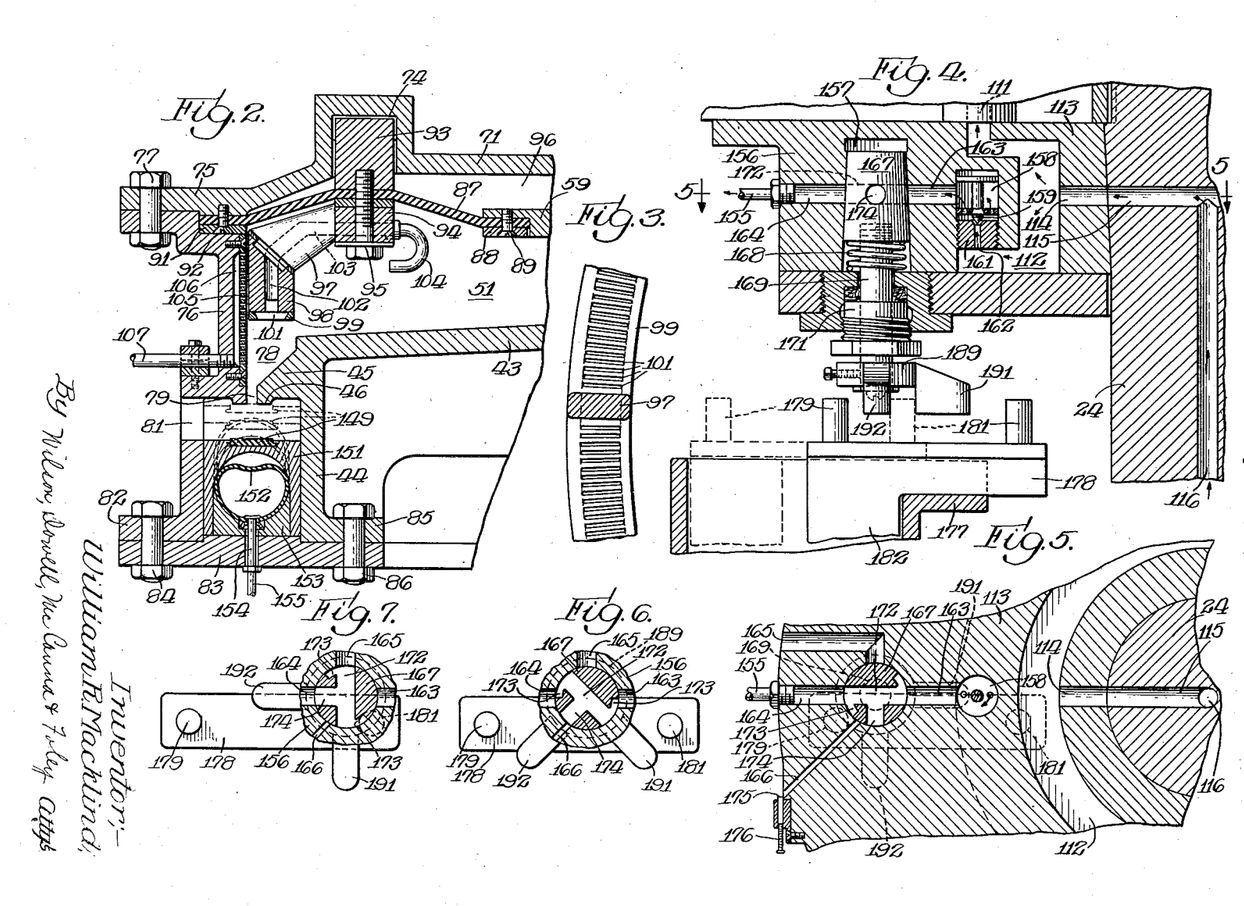
Fig. 2 is an enlarged fragmentary sectional view more clearly showing the solid matter discharge mechanism illustrated in Fig. 1.
Fig. 3 is a fragmentary face view looking upwardly at the lower face of the discharge ram of Fig. 2.
Fig. 4 is an enlarged vertical sectional view showing more in detail one of the air control valves shown in Fig. 1.
Fig. 5 is a horizontal sectional view on the line 5—5 of Fig. 4.
Fig. 6 is a sectional view through the valve, similar to Fig. 5 but showing the valve in throttling position.

It will be observed from Fig. 1 that substantially midway between the table 33 and the housing cover 31 the shaft 24 has rigidly affixed to it by a key or spline 42 an annular plate 43 of substantial dimensions which is preferably sloped downwardly toward its periphery, the inclined portion forming the floor of the separating chamber, as will later be apparent. A depending flange 44 around the perimeter of the plate, affording provision for the support of other parts to be later described, is shaped as shown in Figs. 1 and 2 to provide an inclined ledge or shoulder 45 surrounding the flange and forming one wall of the compacting and discharge passage for the solid separated material. The lower edge of this shoulder depends slightly below the body as indicated at 46 to provide a seat for the lock valve which will be later described.

Above the plate 43, a hub 47 is fixedly secured by spline 48 or otherwise to the shaft. Between this hub and plate 43 an intermediate hub 52 keyed to the shaft carries an annular disc 49 which, as shown in Fig. 1, is spaced above the plate 43 to provide an intervening passage through which the fluid mixture to be separated may flow from the shaft to the surrounding separating chamber 51. The lower end of the hub 52 terminates above ports or openings 53 in the walls of the shaft surrounding the hollow portion which forms an inlet passage 54 leading from the upper end of the shaft to the openings 53 above the plate 43. The liquid mixture to be separated may be delivered into the upper end of the shaft in any suitable manner, but for purposes of illustration I have shown on Fig. 1 of the drawings a funnel-shaped hopper 55 carried upon suitable supports 56 and having a neck 57 depending into the shaft passage through which the material to be separated may be fed.

The hub 47 which is provided with a series of vertically disposed outlet passages 58 is formed to provide above the disc 49 a second annular disc or plate 59, the intervening space between the plates 49 and 59 providing an outflow passage from the separating chamber 51 from which delivery of the separated liquid constituents may take place upwardly through the aforementioned passages 58 as will be apparent from Fig. 1. The overflow from these passages 58 is directed by a disc or plate 61 outwardly away from the shaft into a collector pan 62 supported upon an internal annular shoulder 63 formed on the interior of the housing walls 32. This pan is shaped to provide a depressed annular collecting channel 64 into which the liquid flows and from which it is discharged outside the machine through one or more spouts 65. To prevent splashing of the liquid from the pan, a suitable cover 66 is provided and preferably a seal ring 67 is employed to preclude leakage around its periphery. Access to the pan, if desired, may be had by removal of the small cover plates 68 and 69.

In addition to the plate 59, the hub 47 carries a web 71 spaced above plate 59 and shaped to provide a chamber 72 closed at its upper end by a cover plate 73, a guide chamber 74 for the diaphragm plunger, to be later described, and a marginal flange 75 to which the casting 76 forming the peripheral walls of the separating chamber is attached by bolts 77. The wall 76, as will be best seen from Fig. 2, is spaced from the shoulder 45 carried by the plate flange 44 so as to provide the outer wall of the concentrating chamber 78 and of the discharge passage 79 for the concentrated solids. In fact, when the machine is empty and the parts are in the position shown in Fig. 2, the separating chamber 51 is in open communication with the surrounding atmosphere through the chamber 78, the discharge passage 79 and the ports or openings 81 in the wall 76 below said discharge passage. At its lower end the wall 76 is provided with a peripheral flange 82, and a ring plate 83 secured to this flange by bolts 84 and to a flange 85 by bolts 86 establishes a rigid connection between the wall 76 and the flange 44 so that all of the structure carried by the hub 47 and the plate 43 is securely connected together so as to form a rigid unit carried by and rotatable with the shaft 24.

An annular flat ring-shaped diaphragm 87 has its inner margin clamped to the disc or plate 59 by a clamping ring 88 and screws 89, and its outer margin clamped to the flange 75 of the web 71 by a similar clamping ring 91 and screws 92. Midway its edges the diaphragm is clamped between a guide ring 93 vertically reciprocable in the chamber 74 and a ram carrying ring 94, a series of screw bolts 95 being employed to securely fasten the rings 93, 94 and the diaphragm between them together. The diaphragm, being sealed at both edges, serves therefore in conjunction with the wall or plate 59 to divide the annular space between the plate 43 and the web 71 into two chambers. The lower one, designated 51, of which the plate 43 forms the floor, and disc 59 together with diaphragm 87 forms the ceiling, will be hereafter referred to as the separating chamber; and the upper one, designated 96, of which disc 59 forms the floor and web 71 the ceiling, will be known as the power or ram actuating chamber. The chamber 72 previously described is in communication with, and is in fact a part of, the actuating chamber 96.

The ram carrying ring 94 is equipped with a series of radially disposed arms 97 which together support an annular ring-shaped ram 98 disposed directly over and adapted to enter the previously described concentration chamber 78. This ram or plunger is intermittently actuated to enter and recede from the chamber in a manner which will be later described and, as it compresses on its downward stroke the solid separated matter accumulated in chamber 78, the liquid entrained therewith is afforded provision for escape from the material. Viewing Figs. 2 and 3 it will be observed that the plunger 98 has a reticulated face formed in the embodiment shown by a face plate 99 provided with a series of relatively narrow slots 101 extending therethrough. These slots communicate with a central passage 102 in the plunger which through passages 103 in the arms 97 communicates with the separating chamber 51. Each passage 103 is preferably equipped with a curved discharge pipe 104, the delivery end of which faces away from the axis of the machine so that solid particles which might stop it up will not be thrown by centrifugal force into it.

As a further provision for the escape of liquid entrained in the solid matter accumulating under centrifugal force at the periphery of the separating chamber, the wall 76 is provided at intervals, or continuously if preferred, with a sectional or continuous screen or grating 105 disposed over a recess or recesses 106 formed in the inner face of the wall. Under the pressure exerted by the ram or plunger 98, the liquid exuded from the solid material will pass through the screen or grating into the chamber from whence it may be discharged outside the machine through one or more delivery pipes 107.

When the unit thus far described is rotating at the requisite speed and liquid mixture to be separated is entering from the hopper 55 through the passage 54, this liquid under gravity and centrifugal force will flow beneath the disc 49 to the separating chamber 51 where the solid or heavier matter will be projected by centrifugal action against the peripheral walls 76 of the chamber while the clarified liquid under the head of the inflowing liquid will flow inwardly above the disc 49, thence upwardly through the passages 58 from which it will be delivered over the disc 61 into the pan 62. The pressure built up in the separating chamber 51 as the result of the centrifugal action and the head of the inflowing liquid will exert an upward thrust upon the diaphragm 87, causing it to assume the position indicated in Figs. 1 and 2, and holding the ejecting ram 98 in the upper position shown in these figures. In order to depress the diaphragm and actuate the ram against this pressure a higher counter pressure is built up in the chamber 96. The apparatus by which this counter pressure is established will now be described.

When the machine is assembled, the chamber 96 is supplied with a quantity of liquid, the amount and specific gravity of which will be somewhat dependent upon the character of the liquid mixture which is to be separated. In many cases oil is appropriate and suitable for the purpose and the oil may be introduced into the chamber 72 through any one or more of the filling openings which are normally closed by a plug 108. The chamber 96 may be thus supplied with oil, let us say to approximately the level of the communication between chamber 96 proper and its continuation 72. It will be obvious that the action of the centrifugal force upon this liquid in chamber 96 will of itself counteract to a large degree the upward thrust upon the diaphragm 87 exerted by the centrifugally induced pressure in the separating chamber 51. Consequently the strain upon the diaphragm is very much less than it would be if the diaphragm alone were required to resist the pressure in the separating chamber. Even when the diaphragm is in its upper position and the ram is in the raised position shown in the drawings, the strains to which the diaphragm is subjected are not severe or injurious. To increase the pressure in chamber 96 sufficiently to force the ram downwardly for concentration and extrusion purposes, my invention contemplates augmenting the centrifugal pressure on the upper face of the diaphragm by the admission of fluid such as air under pressure into the chamber 72.

From Fig. 1 it will be observed that an air supply pipe 109 has its delivery end disposed near the top of this chamber 72 above any possible liquid level which might occur in the chamber. The lower end of this pipe communicates with a passage 111 opening into a chamber 112 formed in a hub 113 fixedly secured to the shaft 24 below the hub of the plate 43. One or more radial openings 114 through the hub establish communication between the annular chamber 112 and a transverse passage 115 in the shaft which communicates with a longitudinal bore 116 extending to the lower end of the shaft. A coupling plate 117 fixed to the end of the shaft 24 has a passage 118 through which communication between the bore 116 and a flexible tube 119 is established, the tube being connected through a nipple with the plate 117 and through a similar nipple with a rotatable pipe 121, the lower end of which extends into a stationary air box 122. A packing gland 123 surrounding the pipe prevents leakage from the box around the pipe.

At this point it may be noted that the pipe 121 is driven from the shaft 24 through a driving connection designed to prevent the transmission of vibration and comprising a plurality of studs 124 carried by and depending from the plate 117 and disposed in telescopic relation with upstanding socket members 125 carried by a plate 126 fixed to the upper end of pipe 121. A suitable bearing 127 carried in a yoke 128 maintains the alignment of the pipe with the shaft 24.

Air under pressure is supplied from a compressor or any suitable source of supply through a pipe 129 (Fig. 1a) to a control valve casing 131 from whence it is delivered through pipe 132 to the air box 122. The air control valve in the casing 131 may be of any preferred type, but is herein illustrated as being of the plug type comprising a rotatable plug 133 disposed within the casing and provided with a transversely disposed passageway adapted upon each revolution of the plug to alternately establish and shut off communication between the pipes 129 and 132 so that the frequency of operation of the ram is determined by the speed of rotation of the plug.

The plug 133 also has an exhaust passage through which communication between the pipe 132 and atmosphere through an exhaust port (not shown) in the casing 131 is established in alternation with the establishment of communication between the pipes 129 and 132. The transverse area of the supply and exhaust passages through the plug 133 may be varied in different valves to meet the requirements of the particular separator to which it is supplied so that the supply passage will be effective to supply compressed air in sufficient volume to actuate the ram 98 as will be later described, while the exhaust passage will be effective for a lesser but sufficient length of time to release the pressure in the chamber 96.

Other types of control valves might be employed if preferred, and the valve illustrated may be operated by any suitable mechanism. For illustrative purposes, however, I have shown the stem 134 of the valve as equipped with a friction driven wheel 135 splined on the stem for adjustment to various vertical positions. The stem is preferably surrounded by a sleeve 136 guided in a bearing 137 which is carried by the housing 138 of the control mechanism, and an arm 139, having its inner end engaged with the disc 135 and the sleeve 136 to slide them up and down as a unit, is mounted on a vertically adjustable threaded rod 141 having threaded engagement with a hand wheel nut 142 by rotation of which the vertical position of the rod may be adjusted. The position of adjustment may be determined from a gauge 143 connected with the rod.

The periphery of the friction wheel 135 is disposed in driving relation with a friction disc 144 mounted upon a suitably supported shaft 145 which also carries a large gear 146 meshing with and driven by a pinion 147 fixed to the shaft of a motor 148. In this manner a regulated supply of air is delivered from the valve through pipe 132, box 122, pipe 121, flexible tube 119, bore 116, passage 115, openings 114, chamber 112, passages 111, and tubes 109 into the extension 72 of the chamber 96. This pneumatic pressure augments the centrifugal pressure of the liquid in said chamber, thereby overbalancing the pressure of the chamber 51 so as to depress the diaphragm 87 and thereby positively force the ram 98 downwardly into the concentration chamber 78 to compress the separated solids collected beneath the ram and extrude at each actuation of the ram a portion of said solids through the discharge passage 79.

When the machine is initially put into operation and the liquid mixture to be separated is admitted to the separation chamber 51, it will be obvious that without an accumulation of separated solid matter in the concentration chamber 78 and in the discharge passage 79, the unseparated fluid mixture would flow from the chamber 51 through the discharge passage 79, and no separating operation would take place at all. My invention contemplates, therefore, provision for closing the discharge passage 79 entirely until sufficient separated solid matter has accumulated in the passage and the chamber 78 to form a complete or at least a partial seal, and further contemplates control and regulation of the discharge from the passage 79 in the event that the character of the separated solids is such that the seal effected by the solids themselves would be likely to blow out and thereby permit the discharge of liquid from the separating chamber 51 through the passage 79 when the apparatus is in operation.

With this end in view I have provided within the annular chamber beneath the discharge passage 79 formed by the peripheral walls 76, the flange 44, and the bottom connecting plate 83 a closure for the passage 79 in the form of a locking pad ring 149 made of rubber or other suitable yieldable material which is seated upon an annular block 151 of inverted U-shape which is vertically reciprocable within this chamber from the full line open position of Fig. 2 to the closed position indicated in upper dotted lines on said figure, in which latter position it completely closes the discharge passage 79 and locks the chamber 51 against leakage through this passage.

For the purpose of raising the locking pad to closed position or to any desired intermediate position of control, an annular flexible tube 152 of rubber or the like is positioned between the legs of the block 151 and seated upon a stationary concave supporting block 153 as best shown in Fig. 2. This tube, which resembles in shape, structure, and function an inner tube of a pneumatic tire, extends, as will be understood, entirely around the machine and is rendered effective to sustain the locking pad 149 in any desired adjusted position by the admission of air under pressure to the interior of the tube through one or more nipples 154. The air is delivered to the nipples through tubes 155 (Fig. 1) from control valve casings 156 preferably formed integrally with the hub 113. The construction of these valves will be best understood by reference to Figs. 1 and 4 to 7, inclusive. The hub 113, as will be observed, is upwardly cored to provide one or more plug valve chambers 157 within the casing portion 156 and a corresponding number of check valve chambers 158. Within each of these latter chambers, there is disposed a check valve 159 adapted to close against a removable seat 161 threaded into the bore and provided with a central passage 162 communicating with the chamber 112. Each casing portion of the hub is provided with a passage 163 leading from the check valve chamber to the valve plug chamber and with a passage 164 leading from the valve plug chamber to the exterior of the casing and to which one of said tubes 155 is connected by a nipple or otherwise. Each casing also has a passage 165 (Figs. 5, 6 and 7) communicating with atmosphere and a relief passage 166 also communicating with atmosphere.

Within the plug chamber there is mounted a valve plug 167 yieldingly maintained against its seat by an expansion spring 168 surrounding the downwardly extending stem 169 which is sealed against leakage by a packing gland 171 of usual construction. The plug 167 is provided with an automatically disposed passage 172 which is laterally extended at each end and in opposite directions as indicated at 173. The plug is also provided with a radial passage 174 at right angles to passage 172 similarly to an ordinary three-way valve.

Air pressure being established in the chamber 112 in the manner previously explained, the pressure flows through the passage 162 past the check valve and, assuming the plug valve to be in the position shown in Fig. 5, it continues through the plug into the tube 155 and thence to the interior of the elastic tube 152 to expand such tube and raise the locking pad 149 into closed position to seal and lock the separating chamber against leakage through the passage 79. This position of the locking pad is indicated in Fig. 2 by the upper dotted line position which the pad will assume when the valve is in the position shown in Fig. 5.

Should the character of the material being separated be such that after the machine has been in operation a sufficient time to accumulate a quantity of separated solid material in the chamber 78 and passage 79, this material will per se form an effective seal for the separating chamber, the locking pad may then be permitted to assume its full open position shown in full lines in Fig. 2. For this position of the locking pad, the control valve is turned to the position shown in Fig. 7 so that the air in the elastic tube 152 may escape directly to atmosphere through passages 174 and 172 of the valve and the exhaust passage 165 in the casing.

Should the character of the material being separated, however, be such that control of the discharge is necessary to maintain an effective seal in the discharge passage 79, the locking pad should be maintained in some intermediate position in greater or less proximity to the seat at the delivery end of the discharge passage 79. For illustrative purposes one possible intermediate position is indicated in dotted lines in Fig. 2 between the open and closed positions. To maintain the pad in this position, the valve should be set to approximately the position shown in Fig. 6 from which it will be observed that the air supplied through the plug valve from the passage 163 to the passage 164 is restricted by the position of the plug, and furthermore the relief passage 166 is open to permit direct escape of a portion of the air through this passage. By slight adjustment of the valve so as to vary the restriction of the supply passage therethrough and to also, if necessary, partially cut off the relief passage 166, the position of the locking pad relatively to its seat may be adjusted to a very fine degree of accuracy and maintained for an indefinite period of time. A further regulation of the effective area of the relief passage 166 may be had, if desired, by the adjustment of a small cut-off valve 175 (Fig. 5) mounted on the exterior of the hub 113 and controlled by an adjusting screw 176.

It will be understood that the valves 167 carried by the valve casing portion 156 of the hub 113 are continuously revolving about the axis of the shaft 24 at high speed with the separating unit. In order to adjust and regulate the position of these valves while the unit is in operation, I have provided an adjusting mechanism, the construction and operation of which will be best understood from Figs. 1, 1a, and 4 to 7, inclusive. Referring first to Figs. 1 and 1a, it will be observed that immediately beneath the path of travel of these valves there is mounted in a suitable guideway bracket 177 a radially disposed slide bar 178 carrying a plurality of upwardly projecting pins or studs indicated by 179 and 181, respectively. The slide bar has a depending leg 182 projecting downwardly through the bracket 177 and through a slot on the table 23, and at its lower end carries a nut 183 threadedly engaged with a rod 184 which is journaled in suitable bearings 185 and 186 and is held against longitudinal movement by collars 187 pinned or otherwise secured thereto. A hand wheel 188 mounted on the outer end of the shaft or rod affords provision for adjustable rotation of the shaft to position the guide bar and thereby the studs 179 and 181 in any desired radial position with respect to the path of travel of the valves.

Each valve stem 169, as will be apparent from Figs. 4 to 7, inclusive, carries at its lower end an angular member 189 presenting two adjustment arms 191 and 192 at a height to respectively contact the stud 179 or 181 should either of them be adjusted in the path of its arm as the valves revolve at high speed with the shaft 24. The extreme position of adjustment of the studs 179 and 181 is shown in full and dotted lines, respectively, in Figs. 1 and 4, and it will be obvious that in whatever position the valve plugs 167 and the adjusting arms carried thereby may be, a movement of the stud 181 into the path of the arm 191 will cause a slight turning movement of the valve plug in one direction. By gradually moving the stud farther into the path of its arm, a further rotative movement of the valve will be effected. Likewise movement of the slide bar in the opposite direction to move stud 181 out of the path of its arm 191 and stud 179 into the path of arm 192 will cause a rotative adjusting movement of the valve plug in the opposite direction. In this manner the valves may be adjusted from the full open supply position shown in Fig. 5 to the fully closed exhaust position shown in Fig. 7, or to any intermediate desired position without disturbing in any way the continued operation of the machine.

It should be noted at this point that the periodic relief of the air pressure in the chamber 112 each time the control valve 133 is moved to release or exhaust position will have no effect upon the pressure in the elastic tube 152, because escape of pressure from this tube back into the chamber 112 is at all times precluded by the check valves 159.

It has previously been explained that a portion of the liquid pressed out of the separated solid material collected in the concentration chamber 78 is discharged through the pipes 107, and from Fig. 1 it will be seen that these pipes deliver into a stationary trough 193 formed in the inner stationary casing 194. From this trough the liquid is delivered outside the machine through one or more discharge pipes 195. While this inner casing may be of integral construction, it is preferably sectional and, as shown in Fig. 1, comprises the upper section in which the trough 193 is formed and which rests upon a lower section 196 shaped at its bottom to provide a trough or channel 197 which is rigidly supported from the table 23 upon suitable legs or standards 198. A sealing ring 199 may be employed at the juncture of the sections 194 and 196, or the upper section may be formed to overlap the lower if preferred.

The solid separated and concentrated material extruded through the discharge passage 79 by the ram 98 is thrown by centrifugal force outwardly through the openings 81 into the inner casing where it drops into the annular trough or channel 197. This trough is equipped with one or more discharge spouts 201 through which the solid matter is discharged outside the machine and to which it is moved by a conveyor operating in the trough 197 and comprising a series of paddles or blades 202 carried by arms 203 secured to an internal ring gear 204 supported upon rollers 205 which travel upon a track 206 on the upper face of the table 23. The ring gear is revolved at slow speed to cause the paddles to convey the separated solid material to the troughs 201 by means of a pinion 207 upon the upper end of a shaft 208 which, as shown in Figs. 1 and 1a, is journaled in brackets 209 and 211 and is equipped at its lower end with a worm gear 212 meshing with and driven by a worm 213 upon the shaft of a separate electric motor 214. Of course any other method of driving the ring gear may be equally well utilized. For purposes of stability one or more idler pinions 215 are carried by other brackets 216 similar to bracket 209 in position to idly mesh with the internal teeth of the ring gear.

*Operation*

The operation of that form of my invention which has thus far been described is substantially as follows: Assuming that the machine is empty and that the motor 35 has brought the speed of rotation of the separating unit up to the point required for efficient separation of the liquid mixture to be operated upon, the first thing to do before the liquid is admitted to the separating chamber is to close the discharge passage 79. This is accomplished by manipulation of the handwheel 188 so as to adjust the studs 179 and 181 into a position to cause the full opening of the valves 167 as illustrated in Fig. 5, thereby admitting air under pressure to the elastic tube 152 in sufficient quantities to firmly seat the pad 149 against the lower end of the discharge passage 79, thus sealing the separating chamber 51 against the escape of liquid through this discharge passage. The pad will be held by the air pressure in this locking and sealing position until the position of the plug valves 167 is changed by further manipulation of the handwheel 188.

The liquid mixture to be separated is now delivered into the passage 54 of the shaft from whence it flows outwardly above the plate 43 and below the disc 49 into the separating chamber 51. To prevent lag of the liquid behind the rotating speed of the separator, the inflow and outflow passages to the separating chamber are preferably divided vertically by two or more vertical partition walls 217, as illustrated in Fig. 1. As the separating chamber 51 becomes full, a critical zone becomes established in an intermediate portion of the chamber from which zone the solid matter is thrown by centrifugal force outwardly to the perimeter of the chamber while the clarified liquid turns and flows inwardly from the zone above the disc 49 into the passages 58 and thence into the pan 62 from which it is discharged through the spout or spouts 65. The rate of outflow of the separated liquid will, of course, be dependent upon the head of unseparated liquid maintained in the shaft passage 54. The separated solid material will accumulate in the discharge passage 79 of the concentration chamber 78 at the perimeter of the separating chamber and at intervals, determined by the setting of the air valve control and operating mechanism, the ram 98 will be forced downwardly into the chamber 78 by the pneumatic pressure intermittently established in the chamber 72 which is exerted upon the liquid permanently maintained in the chamber 96 above the diaphragm 87. When a sufficient quantity of solid separated material has been accumulated in the concentration chamber 78 to form an effective liquid seal for the separating chamber, the locking and sealing pad 149 is backed away from its seat to a greater or less degree, depending upon the character of the separated material, by adjustment of the handwheel 188 as previously explained. The collected solid material will thereafter at each actuation of the ram be concentrated and compressed in the chamber 78 and passage 79, and a portion thereof at each actuation of the ram will be extruded downwardly through the passage 79 from whence it is thrown outwardly through the openings 81 and dropped into the collecting channel or trough 197 from which it is discharged by the continuously rotating paddles 202 into the troughs 201. The liquid contained in the separated solid material is driven out by the compressive action of the ram, that portion of the liquid which passes upwardly through the face plate 99 into the ram being delivered through the discharge necks 104 back into the separating chamber, while that portion which exudes through the grille 105 will be delivered by the pipes 107 into the trough 193 and thence outside the machine through the pipe 195.

It will be manifest that the separated solid material is delivered in a highly compacted and comparatively dry condition which, with many types of materials where the solid separated matter is used for commercial purposes, is very desirable. It will also be apparent that the machine is capable of continuous operation, the separated liquid being continuously delivered through the trough 65 and the separated solids being substantially continuously delivered through the trough 201. The frequency of operation of the concentrating and extruding ram may be regulated in accordance with the quantity of solid matter separated by varying the speed of rotation of the air control valve 133 through manipulation of the adjusting wheel 142 as previously explained. The upward thrust on the diaphragm 87 by the liquid under pressure in the separating chamber 51 is almost counterbalanced by the pressure of the liquid under centrifugal force in the chamber 96 above the diaphragm so that no excessive and injurious strains on the diaphragm are exerted. So likewise when the diaphragm is depressed to actuate the ram the pressure above the diaphragm is simply built up to overcome the pressure in the separating chamber and positively depress the diaphragm without exerting excessive and injurious strains upon the diaphragm. The position of the locking pad 149 is maintained by pneumatic pressure which can be readily varied and controlled by manipulation of the handwheel 188 while the machine is operating at full speed. When operating upon some types of concentrated solids, the locking pad may be left in full open position, while with other types which possess inferior inherent self-sealing properties the pad will be adjusted to the requisite closer proximity to the mouth of the discharge passage 79.

*Modifications*

For some separating operations, as, for instance, where the specific gravity of the solid matter to be separated is relatively high so that lower speeds of the separating unit are possible and consequently lower pressures in the separating chamber are produced, it may be desirable or even necessary to employ other force in addition to the pressure in the separating chamber to raise the ram against the action of gravity. For such conditions I have made provision for positive actuation of the ram by controlled pressures not only in its downward or operative movement but also in its upper or retractive movement as well. The structure for accomplishing this result is illustrated somewhat diagrammatically in Fig. 8, in which those parts which have been previously described are indicated by the same reference numerals as have been applied to similar parts in previously described Figs. 1 and 2.

Figure 8:
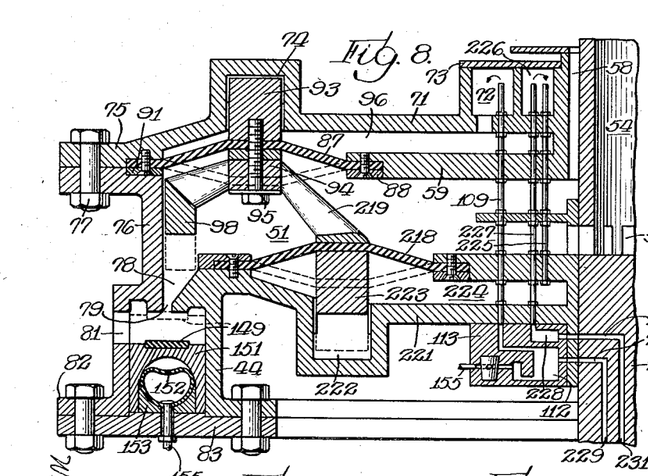
Fig. 8 is a fragmentary view similar to Fig. 2, but illustrating a modification by which positive actuation of the discharge ram in both directions is effected.

Referring to Fig. 8 it will be observed that, in lieu of the solid bottom for the separating chamber provided by the plate 43 in the form previously described, the bottom in this instance includes a diaphragm 218 similar in construction to the diaphragm 87 and connected to the ram supporting ring 94 by arms 219. The wall 221 beneath and spaced from the diaphragm 218 is shaped to provide a guide chamber 222 similar to the chamber 74 and adapted to accommodate a reciprocable guide plunger 223 similar to the guide plunger 93 but in inverted position.

The chamber 224 above the wall 221 and beneath the diaphragm 218 permanently contains a quantity of liquid similar to the chamber 96 and the centrifugally induced pressure of this liquid is augmented by air pressure to raise the diaphragm 218 and thereby the ram 98 into the position shown where it is held until the air pressure in chamber 224 is released to permit the positive depression of the ram 98 by the pressure which is then built up in chamber 96 in the manner previously explained.

Air under pressure is supplied to chamber 224 through a pipe 225 entering the top of the chamber so that liquid cannot enter it by gravity. As illustrated, this pipe opens into a chamber 226 adjacent the chamber 72 and air is supplied to this chamber by pipe 227 which communicates with the chamber 228 formed in the hub 113 adjacent to the chamber 112. In this instance the shaft 24 is provided with a plurality of axially extending air supply passages 229 and 231 which communicate with the chambers 112 and 228 through two or more radial passages 232 and 233, respectively.

The air is supplied to and released from these passages in alternation by a control mechanism which is similar in principle to that previously described, but slightly modified to control two passages instead of one. The mechanism for this purpose is illustrated somewhat diagrammatically in Fig. 10. Referring to this figure, it will be observed that passage 229 communicates through a flexible coupling 234 with a passage 235 in aligned shaft 236. Similarly passage 231 communicates through flexible coupling 237 with a passage 238 in this shaft which is shown as communicating at its lower end with the air box 122 shown on Fig. 1a and previously described. Air is admitted to this box through pipe 132 as in the previous instance and a similar pipe 130 delivers into a second air box 239 surrounding the shaft 236. This box is also stationary and leakage around the shaft is precluded by suitable packing glands 241 and 242.

Figure 10:
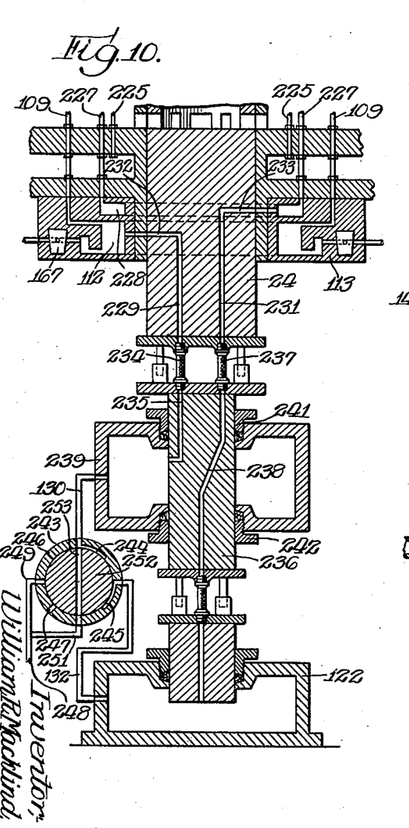
Fig. 10 is a fragmentary vertical sectional view showing the air control for the modifications illustrated in Figs. 8 and 9.

The pipes 132 and 130 are connected with the control valve casing 243 provided with internal grooves or passages 244 and 245 and with discharge ports 246 and 247. The air under pressure is supplied from the pipe 248 which is connected by branches 249 and 251 with the control valve casing as shown. The plug valve 252 in this instance is also provided with a transverse passage 253 which connects alternately the pipe 130 with the supply branch 251 and with the exhaust port 247, and also as the plug further rotates connects pipe 132 alternately with supply branch 249 and with exhaust port 246. In this manner pressure is alternately applied to chamber 96 to depress the ram 98, and then relieved and subsequently applied to chamber 224 to raise the ram, and then is again relieved. By variation and the arrangement of location of the ports and passages in the control valve, the length of time that the pressure will remain on each of these chambers may be varied to secure the desired results.

Figures 9, 13, 14, 15, 16:
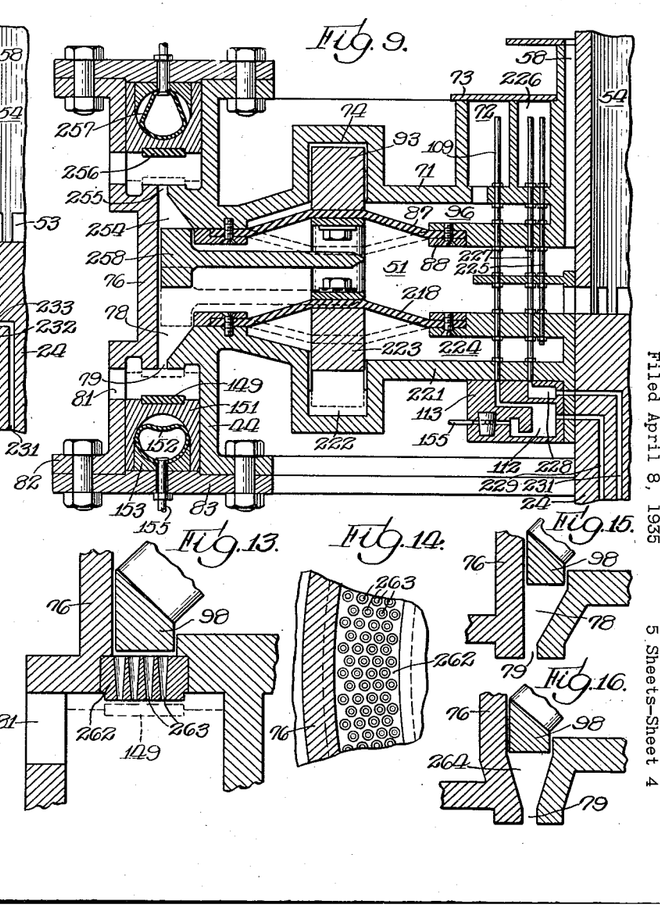
Fig. 9 is a similar view of a further modification which provides for multiple delivery of the separated solid matter.
Fig. 13 is a view similar to Fig. 11, showing still another form of discharge outlet.
Fig. 14 is a view similar to Fig. 12, but looking downwardly upon the discharge plate of Fig. 13.
Figs. 15 and 16 are fragmentary views of further modified forms of discharge outlets.

Some liquid mixtures requiring separation carry solid particles of such different specific gravities that they will automatically tend to accumulate in different zones in the mixing chamber, some accumulating in the lower peripheral portion and other lighter particles accumulating in the peripheral upper portion. For the purpose of discharging these accumulations separately from the machine, my invention in the embodiment illustrated in Fig. 9 is designed to discharge from both the upper and lower outer zones of the chamber. In this instance, in addition to the accumulating chamber 78 and discharge passage 79 at the bottom of the separating chamber 51, a similar but inverted concentrating chamber 254 and discharge passage 255 is provided at the top of the chamber. A locking pad 256 actuated by an elastic pneumatic tube 257, similar in all respects to tube 152, is provided for controlling the discharge through passage 255. Springs or other means may be utilized to retract the pad away from its seat against gravitational force.

The concentrating and extruding ram 258 is provided with an upper as well as a lower operating face as will be apparent from Fig. 9, so that when in the elevated position shown in full lines it will act to concentrate separate solids in the chamber 254 and to extrude the surplus through the discharge passage 255, and when depressed into the position indicated in dotted lines it will operate in the chamber 78 like the ram previously described. In this form of the invention, the chambers 96 and 224 both permanently contain a quantity of liquid, the centrifugally induced pressure of which is augmented alternately in the chambers by the admission of air under pressure in the manner previously explained in connection with Fig. 8. This form of the invention may be used even if the solid matter separated is of substantial uniform specific gravity since it will be obvious that when the ram is in elevated position the separated matter will accumulate in the chamber 78, and when the ram is in its lower position the matter will accumulate above the ram which upon its upward actuation will carry the accumulated matter into the chamber 254.

In the forms of the invention thus far described, the discharge passage 79 for the separated solid matter has been in the form of a relatively narrow slot of circular form and the concentrating chamber has had one vertical side wall and one inclined side wall between which the material has been compacted by the ram and by which the material as compacted has been directed into the discharge passage. An enlarged view of this form of chamber and passage is shown in Fig. 15. This form of chamber and passage, however, is not well suited for some materials upon which my machine is capable of operating, and I have therefore illustrated other modifications.

Figures 11, 12:
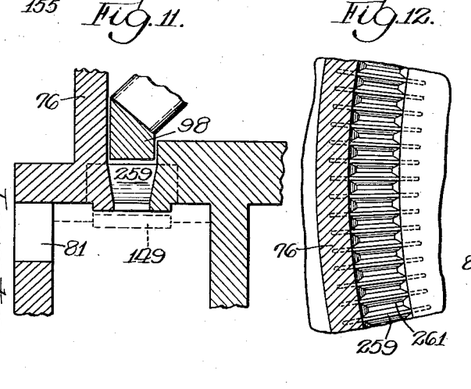
Fig. 11 is a fragmentary view illustrating a modified form of solid matter discharge outlet.
Fig. 12 is a fragmentary view looking downwardly into the discharge passage shown in Fig. 11, and showing the bottom plate provided with tapered discharge slots.

One modified form is shown in Figs. 11 and 12 from which is will be seen that the side walls of the chamber are slotted to accommodate a plurality of partitions or division members 259 which are anchored at their ends in these wall slots and intermediate their ends are tapered so as to provide between them spaces of downwardly diminishing width terminating in narrow discharge openings 261 through which the material, after being compressed between the inclined opposed surface, is extruded by the ram. If preferred these tapered division or partition plates may be mounted on a ring-shaped base, thereby forming a unit which can be bolted or otherwise secured in position. Irrespective of the manner of assembling, the purpose is to provide a series of tapered slots in which the material will be compressed and compacted, and from which it will be extruded in a large number of narrow strips.

In Figs. 13 and 14 the bottom of the concentration chamber is formed by a circular bar or plate 262 which is provided with a large number of closely spaced tapered openings 263 in which the separated material is compacted and from which it is extruded by the ram in small cylindrical pads.

Instead of having only one side wall of the concentration chamber inclined and the other vertical as illustrated in Fig. 15, both walls may be inclined as shown in Fig. 16, thereby producing a symmetrical chamber 264 in which the separated material is compressed and concentrated.

In the forms of the invention thus far described the liquid mixture to be separated has entered the machine at the top and the separated liquid has also been delivered from the machine near the top. For certain services the best results seem to be attainable by utilizing a constant flow through the machine from top to bottom and for such services a machine constructed in accordance with the principles of that schematically shown in Fig. 17 may be adopted. In this instance the main shaft 265 is hollow throughout substantially its entire length except for a division wall 266 by which the inflowing mixture to be separated is deflected outwardly through the openings 267 into the separating chamber 268 from whence it flows inwardly beneath the disc 269 through the openings 271 into the shaft again, from the lower end of which it is discharged through one or more pipes 272 into a chamber 273 from which it is delivered through suitable conduits 274 to any point of disposition. The air for operating the ram and the locking pad instead of being supplied through a passage formed in the shaft as previously is supplied through a pipe 275 equipped with branches 276 delivering into the chamber 112 as heretofore. The operation of the various parts is similar in all substantial respects to that previously explained.

While a circular machine is preferable for most services, there are some uses for which a non-circular or sectoral form of machine may be more suitable. One form of non-circular type is illustrated schematically in Fig. 18 from which it will be seen that instead of a single annular separating chamber the machine is designed to provide four such chambers 277 into which the mixture to be separated is fed from a common central source and from which the separated liquid returns to the center of the machine to be discharged either upwardly or downwardly as preferred. Each chamber will have a diaphragm actuated ram of sectoral instead of circular form and the discharge for the solid material will be controlled by a locking pad actuated pneumatically by an elastic tube of short length. The air supply pipes for these tubes are shown in dotted lines 278 and the locking pads are indicated by 279. The details of construction of the various parts are all similar to those previously described except that instead of being of circular form many of the parts are merely sectors.

Figures 17, 18, 19, 20:
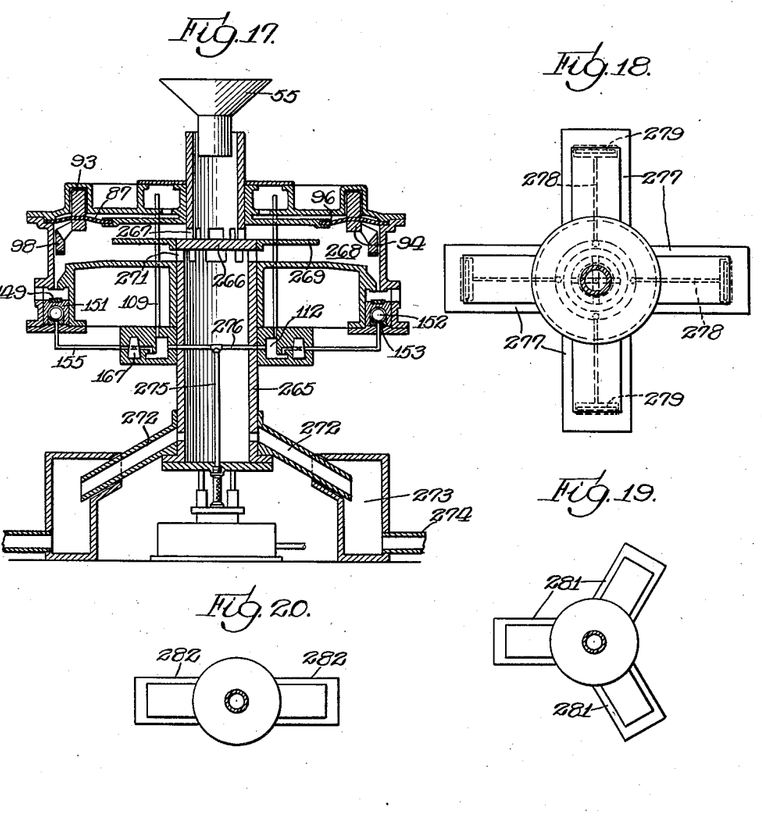
Fig. 17 is a somewhat diagrammatic vertical sectional view of a modified form of separator in which the separated liquid is discharged from the bottom instead of from the top of the machine.
Figs. 18, 19 and 20 are modified schematic plan views of variations from the cylindrical form of machine in which the principles of my invention may be embodied.

In Fig. 19 a sectoral form is shown embodying only three legs 281 projecting radially from the central portion of the machine and each embodying a separating chamber and the attendant mechanisms for performing the necessary operations which have been described at length in connection with the circular type of machine.

In Fig. 20 there is shown a sectoral type comprising only two legs 282, each of which is equipped with the requisite mechanisms for effecting the separation and the discharge of the separated materials and with the necessary control devices.

It will be understood that in all the sectoral types, irrespective of shape, the legs are symmetrically arranged around the axis of the machine so that the machine is balanced and will therefore operate at high speed without undue vibration and injury to the parts. The principle of operation of the circular type will be utilized in the sectoral types of whatever shape, and the various mechanisms will simply be modified in conformity with the shape of machine to which they are applied.

The principles of my invention and the preferred mechanisms for carrying them into effect should be understood from the foregoing without further description, and it should be manifest that the details of construction illustrated and described are capable of considerable modification and variation without departing from the essence of my invention as defined in the following claims.

I claim:

1. A centrifugal separator comprising a separating chamber adapted to contain liquids and solids to be separated, a tapered concentration chamber positioned in proximity to the periphery of the separating chamber with its widest portion communicating therewith, a discharge passage leading from said concentration chamber, and positively actuated means including an annular pressure actuated diaphragm forming part of said separating chamber wall and a circular ram operated thereby for compacting separated solid material in said tapered concentration chamber to provide a seal for said separating chamber, said ram being movable into said concentration chamber for effecting the extrusion through said discharge passage of a portion of the material compacted in said concentration chamber.

2. A centrifugal separator comprising a separating chamber, means for continuously supplying liquid material containing solids to be separated thereto, a tapered concentration chamber in which separated solid material is collected, a ram for compressing said solid material in said concentration chamber and extruding a portion of the compressed material therefrom, a diaphragm forming a portion of the upper wall of the separating chamber and to which said ram is connected, a chamber above said diaphragm containing liquid by which centrifugal pressure is developed in opposition to the centrifugal pressure exerted upon the lower face of the diaphragm from the separating chamber, and means for developing additional pressure in said upper chamber to thereby cause said ram to compress the solid material collected in said concentration chamber and to extrude a portion thereof through the narrow end of said chamber.

3. A continuously operable centrifugal separator comprising a separating chamber adapted to receive fluid carrying solids to be separated, a fluid power chamber above the separating chamber, the dividing wall between said chambers being formed in part by a flexible diaphragm, a discharge passage of diminishing cross sectional area leading from said separating chamber in which the solid separated material is collected, a ram connected to said diaphragm, and means operable during the separating operation of the separating chamber for periodically inducing in said power chamber pressure sufficient to depress the diaphragm against the pressure of the separating chamber and thereby cause said ram to effect the compression in and the positive extrusion of separated solid material from said passage without interrupting the separating operation.

4. In a centrifugal separator, the combination of a rotatable hollow shaft, a separating chamber carried by and rotatable with said shaft for separating liquid and solid materials, a liquid discharge passage from said chamber extending parallel with the axis of said shaft, a discharge passage for separated solid material from said chamber located near the perimeter of the chamber, pneumatically operable means rotatable with said shaft for regulating the discharge from said passage, said means including an annular locking pad adjustable toward and from the solid material discharge passage, an annular collapsible tubular member supporting said pad and a compressed air supply connected thereto, a control valve for said supply carried by said shaft, and means adjustably mounted on a stationary portion of the machine whereby the position of said valve may be manually controlled while the separator is in operation to vary the position of said passage discharge regulating means.

5. In a centrifugal separator, the combination of a rotatable shaft, a separating chamber carried thereby and rotatable therewith to effect the separation of liquid and solid materials, said chamber being provided with an outlet for solid separated materials, positively actuated means in said chamber for compacting and discharging solid material separated in said chamber, means for controlling the frequency of operation of said compacting and discharging means, means including a pad in proximity to the solid material outlet from the chamber, a pneumatic ring supporting said pad, an air supply for said ring, an air valve rotatable with the shaft and a manually operable valve control device, whereby the degree of inflation of said ring may be controlled to thereby regulate the proximity of said pad to said chamber outlet for controlling the discharge of solid material from said outlet, a housing for the separator, means for delivering the discharged solid material outside the housing, and means for delivering the separated liquid material outside the housing.

6. In a centrifugal separator, the combination of a vertically disposed rotatable shaft, a separating chamber carried by and rotatable with said shaft, means for continuously supplying material to be separated to said chamber, a flexible diaphragm forming a portion of one wall of said chamber, a discharge ram connected to said diaphragm and located in said chamber, a tapered discharge passage leading from said chamber, and means for inducing a pressure outside said chamber in excess of the chamber pressure to move said ram during the separating operation of said chamber into said discharge passage to compress the separated material therein and extrude a portion thereof from the passage.

7. A centrifugal separator comprising a rotatable separating chamber adapted to separate solid material from liquid, said chamber opening near its periphery into a concentration chamber, a positively actuated ram for compacting solid separated material in said concentration chamber and causing the extrusion of a portion of said material therefrom, and means including a conduit carried by said ram for returning to the concentration chamber liquid exuded from said material during the compacting operation.

8. A centrifugal separator comprising a separating chamber opening into a concentration chamber having converging walls, a ram movable in said separating chamber toward and from the large end of said concentration chamber for compacting in said concentration chamber solid material separated from liquid in said separating chamber, said ram being provided with a perforated face and with passages in communication with said perforations through which liquid exuded from the material during the compacting may be delivered, and means for returning said liquid to said concentration chamber.

9. A centrifugal separator comprising a rotatable separating chamber adapted to receive liquid and solid materials for separation, said chamber being provided near the perimeter thereof with a tapered discharge passage for the separated solids and near the center thereof with a discharge passage for the separated liquids, means for continuously supplying material in liquid form to be separated to said chamber, a pressure chamber adjacent to said separating chamber, a flexible diaphragm forming a portion of the dividing wall between said chambers, a circular ram attached to said diaphragm and disposed for reciprocation within said separating chamber in cooperative relation with said tapered discharge passage and whereby said solids are first compacted into said passage and then extruded from the small end thereof, means including a circular pneumatic tube rotatable with said chambers, manually controlled means for inflating said tube and a pad movable by said tube toward said discharge passage, whereby the discharge from said passage may be controlled, and means for alternately establishing and exhausting pressure in said pressure chamber to thereby actuate said ram, movement of said ram being permitted by flexure of said diaphragm.

10. A centrifugal separator comprising a rotatable separating chamber provided with a discharge passage for the separated solids, means for continuously supplying material comprising liquid carrying solids to be separated to said chamber, a flexible diaphragm forming a portion of one wall of said chamber, a ram connected to said diaphragm and disposed in cooperative relation to said discharge passage for compacting separated solid material therein and extruding the same therefrom, means for controlling the discharge from said passage, comprising a locking pad and a circular pneumatic tube for operating said pad rotatable with said chamber, stationary means for controlling the inflation of said tube, and pressure actuated means outside said chamber for flexing said diaphragm and causing said ram to move into cooperative relation with said discharge passage.

11. In a centrifugal separator, the combination of a rotatable separating chamber provided with a tapered discharge passage, means for continuously supplying material to be separated to said chamber, a flexible diaphragm forming a portion of one wall of said chamber, a ram connected to said diaphragm and located in said chamber, and means for inducing a pressure outside said chamber in excess of the chamber pressure to thereby force said ram during the separating operation of said chamber into said tapered passage to compress separated material therein.

12. In a centrifugal separator, the combination of a rotatable separating chamber including a flexible diaphragm incorporated in a wall thereof, means for supplying liquid and solid materials, to be separated to said chamber, a ram in said chamber connected with said diaphragm, pressure actuated means outside said chamber for moving said ram and flexing said diaphragm against the chamber pressure, and a tapered concentration chamber having the larger end thereof communicating with said separating chamber in alignment with and proportioned to receive said ram, wherein separated solids are compressed and from the smaller end of which a portion of the same are extruded, upon movement of said ram into said concentration chamber.

13. A centrifugal separator comprising a separating chamber of substantially equal depth throughout its area and including a flexible diaphragm in one wall thereof, means for continuously delivering fluid material carrying solids to be separated to the lower portion of said chamber, means for conducting separated liquid from the upper portion of said chamber, a tapered annular discharge passage near the perimeter of said chamber in which separated solid material is accumulated, an annular ram located within said chamber in cooperative relation to said discharge passage and connected with said diaphragm, means for intermittently forcing said ram into cooperative relation with said tapered discharge passage to compact the separated material in said passage and extrude a portion thereof from the smaller end of said passage, and pneumatically actuated means for controlling said discharge, said last mentioned means including a pneumatically operable pad rotatable with the chamber, an air supply, and a stationary manually operable control device for regulating the position of said pad.

WILLIAM R. MACKLIND.